(12) United States Patent
Washino

(10) Patent No.: US 11,845,860 B2
(45) Date of Patent: Dec. 19, 2023

(54) FLAME-RETARDANT HIGH-DAMPING MATERIAL

(71) Applicant: Kitagawa Industries Co., Ltd., Inazawa (JP)

(72) Inventor: Shinya Washino, Kasugai (JP)

(73) Assignee: Kitagawa Industries Co., Ltd., Kasugai (JP)

( * ) Notice: Subject to any disclaimer, the term of this patent is extended or adjusted under 35 U.S.C. 154(b) by 771 days.

(21) Appl. No.: 16/975,074

(22) PCT Filed: Feb. 14, 2019

(86) PCT No.: PCT/JP2019/005378
§ 371 (c)(1),
(2) Date: Aug. 21, 2020

(87) PCT Pub. No.: WO2019/163644
PCT Pub. Date: Aug. 29, 2019

(65) Prior Publication Data
US 2021/0087386 A1     Mar. 25, 2021

(30) Foreign Application Priority Data
Feb. 22, 2018   (JP) ................................ 2018-029859

(51) Int. Cl.
| | |
|---|---|
| *C08L 5/02* | (2006.01) |
| *C08L 25/08* | (2006.01) |
| *C08L 85/02* | (2006.01) |
| *F16F 1/36* | (2006.01) |
| *C08K 3/22* | (2006.01) |
| *C08K 5/3492* | (2006.01) |
| *C08K 5/5313* | (2006.01) |
| *C08L 53/02* | (2006.01) |
| *C09K 21/12* | (2006.01) |
| *C08K 3/04* | (2006.01) |
| *C08L 57/02* | (2006.01) |

(52) U.S. Cl.
CPC ................ *C08L 57/02* (2013.01); *C08K 3/04* (2013.01); *C08K 3/22* (2013.01); *C08K 5/34928* (2013.01); *C08K 5/5313* (2013.01); *C08L 25/08* (2013.01); *C08L 53/025* (2013.01); *C08L 85/02* (2013.01); *C09K 21/12* (2013.01); *F16F 1/3605* (2013.01); *C08K 2003/2224* (2013.01); *F16F 2224/02* (2013.01); *F16F 2224/025* (2013.01); *F16F 2224/048* (2013.01)

(58) Field of Classification Search
CPC .... C08K 3/22; C08K 5/34928; C08K 5/5313; C08K 3/04; C08K 2003/2224; C08L 57/02; C08L 25/08; C08L 85/02; C08L 53/025; C09K 21/12; F16F 1/3605; F16F 2224/02; F16F 2224/025; F16F 2224/048
See application file for complete search history.

(56) References Cited

FOREIGN PATENT DOCUMENTS

| EP | 1277822 | * | 1/2003 |
|---|---|---|---|
| JP | 2001-019853 | | 1/2001 |
| JP | 2013-104046 | * | 5/2013 |
| JP | 2018-012785 | * | 1/2018 |

OTHER PUBLICATIONS

Machine English translation of JP 2018-012785, Washino, Jan. 2018.*
Machine English translation of JP 2001-019853, Aoyama et al., Jan. 2001.*
Machine English translation of JP 2013-104046, Mori et al., May 2013.*

* cited by examiner

*Primary Examiner* — Patrick D Niland
(74) *Attorney, Agent, or Firm* — Thorpe North & Western

(57) ABSTRACT

A flame-retardant high-damping material includes 100 parts by mass of styrene elastomer; from 68 to 72 parts by mass of high-viscosity oil having a kinematic viscosity of 380 mm$^2$/s or more at a temperature of 40° C.; from 72 to 132 parts by mass of melamine polyphosphate flame retardant; from 121 to 173 parts by mass of organic phosphinic acid metal salt flame retardant; and from 90 to 186 parts by mass of tackifying resin.

2 Claims, No Drawings

FLAME-RETARDANT HIGH-DAMPING MATERIAL

RELATED APPLICATIONS

This application is the national stage of international patent application no. PCT/JP2019/005378, filed on Feb. 14, 2019, which claims the benefit of priority from Japan patent application no. 2018-029859, filed on Feb. 22, 2018, the entire contents of each of which are incorporated herein by reference.

TECHNICAL FIELD

The present technology relates to a flame-retardant high-damping material.

BACKGROUND ART

Heretofore, vibration damping materials with high damping properties have been used as vibration damping measures for devices such as a fan of a printer or a projector; or a power conditioner which is a kind of inverter. As such a vibration damping material, for example, a material including a thermoplastic polymer organic material, a paraffin process oil, and a hydrogenated petroleum resin is known (see Japan Unexamined Patent Application Publication No. 2001-19853).

Generally, electrical equipment is required to have flame retardancy. Although the vibration damping material described in Japan Unexamined Patent Application Publication No. 2001-19853 exhibits excellent vibration damping properties, it is still insufficient in flame retardancy, and further improvement is required.

SUMMARY

The present technology provides a high-damping material having excellent flame retardancy.

As a result of intensive studies, it was found that a flame-retardant high-damping material having excellent flame retardancy can be obtained by using a composition containing a high-viscosity oil, a melamine polyphosphate flame retardant, an organic phosphinic acid metal salt flame retardant, and a tackifying resin in a predetermined ratio in a styrene elastomer.

That is, the present technology is a flame-retardant high-damping material including:
  100 parts by mass of styrene elastomer (A);
  from 68 to 72 parts by mass of high-viscosity oil (B) having a kinematic viscosity of 380 mm$^2$/s or more at a temperature of 40° C.;
  from 72 to 132 parts by mass of melamine polyphosphate flame retardant (C);
  from 121 to 173 parts by mass of organic phosphinic acid metal salt flame retardant (D), and
  from 90 to 186 parts by mass of tackifying resin (E).

Generally, a flame retardant is mixed in a high-damping material. The present technology is based on the finding that flame retardancy is significantly improved by mixing at least two predetermined types of phosphorus flame retardants in a predetermined ratio. Such a flame-retardant high-damping material is superior in flame retardancy as compared with known ones.

The flame-retardant high-damping material may include magnesium hydroxide and carbon as flame retardant aids.

According to the present technology, a high-damping material having excellent flame retardancy is obtained.

DETAILED DESCRIPTION

Embodiments of the present technology will be described below in detail. The present technology is a high-damping material including:
  100 parts by mass of styrene elastomer (A);
  from 68 to 72 parts by mass of high-viscosity oil (B) having a kinematic viscosity of 380 mm$^2$/s or more at a temperature of 40° C.;
  from 72 to 132 parts by mass of melamine polyphosphate flame retardant (C);
  from 121 to 173 parts by mass of organic phosphinic acid metal salt flame retardant (D), and
  from 90 to 186 parts by mass of tackifying resin (E).

Examples of styrene elastomer (A) used as the base resin include a block copolymer of a polystyrene block; and an elastomer block having a flexible polyolefin structure. Specifically, one or more selected from polystyrene-poly(ethylene/propylene) block (SEP), polystyrene-poly(ethylene/propylene) block-polystyrene (SEPS), polystyrene-poly(ethylene/butylene) block-polystyrene (SEBS), and polystyrene-poly(ethylene-ethylene/propylene) block-polystyrene (SEEPS) may be used.

These styrene elastomers have high elasticity and high strength like rubber in a wide temperature range and are excellent in heat deterioration resistance, weather resistance, and low temperature characteristics.

Examples of the styrene elastomer (for example, SEEPS) include "Septon 4055" (trade name, available from Kuraray Co., Ltd.), "Septon 4077" (trade name, available from Kuraray Co., Ltd.), and "Septon 4099" (trade name, available from Kuraray Co., Ltd.).

As high-viscosity oil (B) used as a softener, one or more selected from paraffin process oil, naphthene process oil, aromatic process oil, poly-α-olefin (PAO), liquid polybutene, liquid polyisobutylene, and the like may be used.

The high-viscosity oil used in the present technology is preferably a paraffin process oil having a kinematic viscosity of 380 mm$^2$ or more at a temperature of 40° C. The paraffin process oil has a high compatibility with the above-mentioned styrene elastomer (A) as the base resin and can suppress the occurrence of oil bleeding. Further, it can prevent the oil generated by the oil bleeding from being transferred to the adherend of the flame-retardant high-damping material and contaminating the adherend.

As the high-viscosity paraffin process oil, for example, Diana Process Oil PW-380 (trade name, available from Idemitsu Kosan Co., Ltd., Mw=750, Mw/Mn=1.15, kinematic viscosity (40° C.)=380 mm$^2$/s) may be used.

The mixing ratio of the high-viscosity oil is from 68 to 72 parts by mass, preferably from 69 to 72 parts by mass, with respect to 100 parts by mass of styrene elastomer (A). When the content of the high-viscosity oil is 68 parts by mass or more, the hardness becomes low and the vibration damping properties become good. On the other hand, when the content is 72 parts by mass or less, the occurrence of oil bleeding and tackiness can be suppressed.

As described above, the flame-retardant high-damping material of the present technology includes at least two predetermined types of phosphorus flame retardants, thereby significantly improving flame retardancy. The two types of phosphorus flame retardants are melamine polyphosphate flame retardant (C) and organic phosphinic acid metal salt flame retardant (D). Examples of the metal include Al, Mg, Ca, Ti, Zn, Sn, and the like.

The mixing ratios of these flame retardants are such that from 72 to 132 parts by mass, preferably from 79 to 108 parts by mass, of melamine polyphosphate flame retardant (C) and from 121 to 173 parts by mass, preferably 127 to 159 parts by mass, of organic phosphinic acid metal salt flame retardant (D), with respect to 100 parts by mass of styrene elastomer (A). When the mixing ratio of these components are 72 parts by mass or more and 121 parts by mass or more, respectively, sufficient flame retardancy can be obtained. Further, when these amounts are 132 parts by mass or less and 173 parts by mass or less, respectively, the mixing ratio of the flame retardant to the high-damping material is suppressed, the vibration damping properties (loss factor), which is important as the characteristic of the high-damping material, can be ensured.

The mixing ratio of the flame retardant (the sum of (C) and (D)) to the high-damping material is from 37 to 48 parts by mass and is preferably from 39 to 46 parts by mass, with respect to the whole. When the mixing ratio of the flame retardant is 37 parts by mass or more, sufficient flame retardancy can be obtained, and when it is less than 48 parts by mass, the mixing ratio can be suppressed and vibration damping properties can be improved. The mass ratio of (C) and (D) is preferably in the range of 1:1 to 5:11. Within this range, the synergistic effect of the two types of flame retardants can be easily obtained.

As tackifying resin (E), those having affinity with a styrene elastomer, for example, one or more types selected from, for example, hydrogenated terpene resin, terpene resin, aromatic modified terpene resin, aliphatic petroleum resin, hydrogenated rosin ester, aromatic resin, and styrene resin may be mixed and used.

As the tackifying resin, for example, Alcon P-100 (trade name, available from Arakawa Chemical Industries, Ltd., softening point 100±5° C.) may be used.

The mixing ratio of the tackifying resin is from 90 to 186 parts by mass, preferably from 101 to 158 parts by mass, with respect to 100 parts by mass of styrene elastomer (A). When the content of the tackifying resin is 90 parts by mass or more, the loss factor increases and the vibration damping properties improve. On the other hand, when the content is 186 parts by mass or less, flame retardancy can be ensured and tackiness can be suppressed.

Further, magnesium hydroxide and/or carbon may be included as flame retardant aids.

The flame-retardant high-damping material may further include other components as long as the technology is not impaired. Examples of the other components include colorants (pigments, dyes, etc.), conductive fillers, ultraviolet absorbers, plasticizers, preservatives, solvents, and other types of flame retardants.

The flame-retardant high-damping material of the present embodiment can be produced by mixing styrene elastomer (A), high-viscosity oil (B) having a kinematic viscosity of 380 mm$^2$/s or more at a temperature of 40° C., melamine polyphosphate flame retardant (C), organic phosphinic acid metal salt flame retardant (D), and tackifying resin (E) in a predetermined ratio; and subjecting the mixture to heat melting and kneading using a kneader or extruder. Additives such as colorants may be added as necessary.

The kneaded product may be molded into a desired shape such as a sheet by injection molding, compression molding, T-die extrusion molding, or the like. The sheet-shaped flame-retardant high-damping material is excellent in workability and formability. The form of the flame-retardant high-damping material is not particularly limited as long as the technology is not impaired.

The flame-retardant high-damping material may be used as it is in direct contact with a vibration-damping target such as a vibration source or may be used such that one adhesive surface of an adhesive layer of double-sided adhesive type (double-sided adhesive tape) is adhered to the flame-retardant high-damping material, and the other adhesive surface is adhered to the vibration-damping target.

EXAMPLES

The present technology will be described below in more detail based on examples. The present technology is not limited to these examples.

A softener, a flame retardant, a tackifying resin, and flame retardant aids were blended in the mixing ratio (parts by mass) indicated in Tables 1 to 5, with respect to 100 parts by mass of a styrene elastomer as a base polymer, and the mixture was kneaded under the conditions of 30 rpm and 180° C. for 5 minutes by using LABO PLASTOMILL (product name "4C150 type LABO PLASTOMILL", available from Toyo Seiki Seisaku-sho, Ltd.), thereby obtaining compositions of Examples 1 to 14 and Comparative Examples 1 to 17. After each composition was allowed to cool to 100° C. or lower, it was taken out from LABO PLASTOMILL and hot-press molded under the conditions of 180° C., 10 MPa, 1 minute to obtain a sheet-shaped high-damping material.

Note that the components (materials) used in each of the examples and comparative examples are as follows.

"Styrene elastomer": SEEPS (styrene-ethylene-ethylene-propylene-styrene block copolymer), trade name "SEPTON 4055", available from Kuraray Co., Ltd.

Softener (low viscosity): Process oil, trade name "Diana Process Oil PW-90", available from Idemitsu Kosan Co., Ltd.

Softener (high viscosity): Process oil, trade name "Diana Process Oil PW-380", available from Idemitsu Kosan Co., Ltd.

Phosphorus flame retardant A: Melamine polyphosphate flame retardant

Phosphorus flame retardant B: Organic phosphinic acid metal salt flame retardant Phosphorus flame retardant C: Phosphazene flame retardant Phosphorus flame retardant D: Amine phosphate flame retardant Phosphorus flame retardant E: Organic phosphorus flame retardant Phosphorus flame retardant F: Amine phosphate flame retardant Tackifying resin: trade name: "ALCON P-100", available from Arakawa Chemical Industries, Ltd.

Flame retardant aid a: Magnesium hydroxide

Flame retardant aid b: Carbon

The high-viscosity oil has a kinematic viscosity of 380 mm$^2$/s at a temperature of 40° C., and the low-viscosity oil has a kinematic viscosity of 92 mm$^2$/s at a temperature of 40° C.

<Evaluation Method>

(1) Hardness

A 60 mm×60 mm×6 mm thick test piece cut out from each sample was subjected to a low-pressure load according to the method specified in JIS (Japanese Industrial Standard) K 6253, and the type A hardness was measured 30 seconds after the application of the low-pressure load. A rubber/plastic hardness meter (available from Teclock Co., Ltd.) was used as a measuring instrument.

(2) Flame Retardancy

A 125 mm×13 mm×1.5 mm thick test piece and a 125 mm×13 mm×1.0 mm thick test piece cut out from each sample were subjected to a combustion test according to the method specified in UL94.

In the columns of flame retardancy evaluation in Tables 1 to 5 below, the results for the thickness of 1.5 mm are shown in the upper row and the results for the thickness of 1.0 mm are shown in the lower row. The flammability classification of V-0 is evaluated as Excellent, V-1 is evaluated as Good, and not is evaluated as Fail. Note that there was no V-2.

(3) Loss Factor (Vibration Damping Properties Evaluation)

Four pieces of 5 mm×5 mm×3 mm thick test pieces were cut out from each sample, and a load of 1000 g was placed on a vibration table that can be vibrated at an arbitrary frequency under room temperature conditions of 23° C. The test pieces were sandwiched between the load and the vibration table at the four corners of the load, and the load was fixed in a state of being supported at four points.

In this state, the vibration table was vibrated at an acceleration of 0.4 G, and the frequency of the vibration was changed from 10 to 1000 Hz over 7.5 minutes to cause primary and secondary resonance. The vibration of the load at this time was detected by an acceleration pickup, and a resonance curve was drawn based on this data.

Next, based on the resonance frequency f0 (Hz) showing the peak value (resonance magnification) of the resonance curve and the frequencies f1 and f2 (f1<f0<f2) showing the value 3 dB lower than the peak value, the loss factor tan δ was calculated from the following equation (1), and the vibration damping properties were evaluated according to the following criteria. When the evaluation was Good or Excellent, it was judged to have vibration damping properties.

Fail: Loss factor of 0.8 or less
Good: Loss factor of 0.9 to 1.0
Excellent: Loss factor of 1.0 or more $$\tan \delta = \Delta f / f0 \text{ (where } \Delta f = f2 - f1) \tag{1}$$

(4) Hydrolysis Resistance

After being heated in an atmosphere of 98° C. for 24 hours, the surface was observed, and it was visually confirmed whether hydrolysis had occurred. The case where hydrolysis was not observed was evaluated as Good, and the case where hydrolysis was observed was evaluated as Fail.

(5) Tackiness

An indenter with a diameter of 15 mm was dropped from a sheet thickness position (start position) to a position of 4.9 N at a speed of 30 mm/min with a tabletop precision universal testing machine, and pressure was applied for 10 seconds from the time when a force of 4.9 N was applied. The pressure-bonded product was pulled up at 30 mm/min, and the tackiness (N) was measured when the pressure reached the starting position. As a measuring instrument, a tabletop precision universal testing machine (available from Shimadzu Corporation) was used.

The evaluation results are shown in Tables 1 to 5.

TABLE 1

|  | Comparative Example 1 | Example 1 | Example 2 | Example 3 | Comparative Example 2 | Comparative Example 3 |
|---|---|---|---|---|---|---|
| Base polymer | 100 | 100 | 100 | 100 | 100 | 100 |
| Softener (low viscosity) |  |  |  |  |  | 69.2 |
| Softener (high viscosity) | 67.2 | 68.2 | 69.2 | 71.2 | 72.2 |  |
| Phosphorus flame retardant A | 87.8 | 87.8 | 87.8 | 87.8 | 87.8 | 87.8 |
| Phosphorus flame retardant B | 130.3 | 130.3 | 130.3 | 130.3 | 130.3 | 130.3 |
| Phosphorus flame retardant C |  |  |  |  |  |  |
| Phosphorus flame retardant D |  |  |  |  |  |  |
| Phosphorus flame retardant E |  |  |  |  |  |  |
| Phosphorus flame retardant F |  |  |  |  |  |  |
| Tackifying resin | 107.7 | 107.7 | 107.7 | 107.7 | 107.7 | 107.7 |
| Flame retardant aid a | 6.15 | 6.15 | 6.15 | 6.15 | 6.15 | 6.15 |
| Flame retardant aid b | 4.1 | 4.1 | 4.1 | 4.1 | 4.1 | 4.1 |
| Hardness (JIS A) | 34 | 32 | 31 | 28 | 27 | 31 |
| Flame retardancy 1.5 mm | Excellent | Excellent | Excellent | Excellent | Excellent | Good |
| Flame retardancy 1.0 mm | Excellent | Excellent | Excellent | Excellent | Excellent | Fail |
| Foss factor | 0.8 | 0.9 | 1.2 | 1.3 | 1.3 | 1.2 |
|  | Fail | Good | Excellent | Excellent | Excellent | Excellent |
| Hydrolysis | Excellent | Excellent | Excellent | Excellent | Excellent | Excellent |
| Tackiness (formability) | Excellent | Excellent | Excellent | Excellent | Fail | Excellent |

TABLE 2

|  | Comparative Example 4 | Example 4 | Example 5 | Example 6 | Example 7 | Comparative Example 5 |
|---|---|---|---|---|---|---|
| Base polymer | 100 | 100 | 100 | 100 | 100 | 100 |
| Softener (low viscosity) |  |  |  |  |  |  |
| Softener (high viscosity) | 69.2 | 69.2 | 69.2 | 69.2 | 69.2 | 69.2 |
| Phosphorus flame retardant A | 69.4 | 76 | 79 | 108 | 125 | 137.9 |

TABLE 2-continued

|  | Comparative Example 4 | Example 4 | Example 5 | Example 6 | Example 7 | Comparative Example 5 |
|---|---|---|---|---|---|---|
| Phosphorus flame retardant B | 130.3 | 130.3 | 130.3 | 130.3 | 130.3 | 130.3 |
| Phosphorus flame retardant C |  |  |  |  |  |  |
| Phosphorus flame retardant D |  |  |  |  |  |  |
| Phosphorus flame retardant E |  |  |  |  |  |  |
| Phosphorus flame retardant F |  |  |  |  |  |  |
| Tackifying resin | 107.7 | 107.7 | 107.7 | 107.7 | 107.7 | 107.7 |
| Flame retardant aid a | 6.15 | 6.15 | 6.15 | 6.15 | 6.15 | 6.15 |
| Flame retardant aid b | 4.1 | 4.1 | 4.1 | 4.1 | 4.1 | 4.1 |
| Hardness (JIS A) | 31 | 31 | 31 | 31 | 32 | 34 |
| Flame retardancy 1.5 mm | Fail | Excellent | Excellent | Excellent | Excellent | Excellent |
| Flame retardancy 1.0 mm | Fail | Good | Excellent | Excellent | Excellent | Excellent |
| Foss factor | 1.2 | 1.2 | 1.2 | 1.1 | 1.0 | 0.8 |
|  | Excellent | Excellent | Excellent | Excellent | Good | Fail |
| Hydrolysis | Excellent | Excellent | Excellent | Excellent | Excellent | Excellent |
| Tackiness (formability) | Excellent | Excellent | Excellent | Excellent | Excellent | Excellent |

TABLE 3

|  | Comparative Example 6 | Example 8 | Example 9 | Example 10 | Comparative Example 7 |
|---|---|---|---|---|---|
| Base polymer | 100 | 100 | 100 | 100 | 100 |
| Softener (low viscosity) |  |  |  |  |  |
| Softener (high viscosity) | 69.2 | 69.2 | 69.2 | 69.2 | 69.2 |
| Phosphorus flame retardant A | 79 | 79 | 79 | 79 | 79 |
| Phosphorus flame retardant B | 115.5 | 126.6 | 158.8 | 161.2 | 184.6 |
| Phosphorus flame retardant C |  |  |  |  |  |
| Phosphorus flame retardant D |  |  |  |  |  |
| Phosphorus flame retardant E |  |  |  |  |  |
| Phosphorus flame retardant F |  |  |  |  |  |
| Tackifying resin | 107.7 | 107.7 | 107.7 | 107.7 | 107.7 |
| Flame retardant aid a | 6.15 | 6.15 | 6.15 | 6.15 | 6.15 |
| Flame retardant aid b | 4.1 | 4.1 | 4.1 | 4.1 | 4.1 |
| Hardness (JIS A) | 31 | 31 | 31 | 32 | 33 |
| Flame retardancy 1.5 mm | Fail | Excellent | Excellent | Excellent | Excellent |
| Flame retardancy 1.0 mm | Fail | Good | Excellent | Excellent | Excellent |
| Loss factor | 1.3 | 1.2 | 1.1 | 1.0 | 0.8 |
|  | Excellent | Excellent | Excellent | Good | Fail |
| Hydrolysis | Excellent | Excellent | Excellent | Excellent | Excellent |
| Tackiness (formability) | Excellent | Excellent | Excellent | Excellent | Excellent |

TABLE 4

|  | Application 10 Comparative Example 8 | Application 11 Comparative Example 9 | Application 12 Comparative Example 10 | Application 13 Comparative Example 11 |
|---|---|---|---|---|
| Base polymer | 100 | 100 | 100 | 100 |
| Softener (low viscosity) |  |  |  |  |
| Softener (high viscosity) | 69.2 | 69.2 | 69.2 | 69.2 |
| Phosphorus flame retardant A | 217.6 | 242.3 |  |  |
| Phosphorus flame retardant B |  |  | 217.6 | 242.3 |
| Phosphorus flame retardant C |  |  |  |  |
| Phosphorus flame retardant D |  |  |  |  |
| Phosphorus flame retardant E |  |  |  |  |
| Phosphorus flame retardant F |  |  |  |  |
| Tackifying resin | 107.7 | 107.7 | 107.7 | 107.7 |
| Flame retardant aid a | 6.15 | 6.15 | 6.15 | 6.15 |
| Flame retardant aid b | 4.1 | 4.1 | 4.1 | 4.1 |
| Hardness (JIS A) | 31 | 31 | 31 | 31 |
| Flame retardancy 1.5 mm | Fail | Fail | Fail | Fail |
| Flame retardancy 1.0 mm | Fail | Fail | Fail | Fail |

TABLE 4-continued

|  | Application | | | |
| --- | --- | --- | --- | --- |
|  | 9 | 10 | 11 | 12 |
| Loss factor | 1.2 | 1.0 | 1.2 | 1.0 |
|  | Excellent | Good | Excellent | Good |
| Hydrolysis | Excellent | Excellent | Excellent | Excellent |
| Tackiness (formability) | Excellent | Excellent | Excellent | Excellent |

|  | Application | | | |
| --- | --- | --- | --- | --- |
|  | 14 Comparative Example 12 | 15 Comparative Example 13 | 16 Comparative Example 14 | 17 Comparative Example 15 |
| Base polymer | 100 | 100 | 100 | 100 |
| Softener (low viscosity) |  |  |  |  |
| Softener (high viscosity) | 69.2 | 69.2 | 69.2 | 69.2 |
| Phosphorus flame retardant A |  |  |  |  |
| Phosphorus flame retardant B |  |  |  |  |
| Phosphorus flame retardant C | 217.6 |  |  |  |
| Phosphorus flame retardant D |  | 217.6 |  |  |
| Phosphorus flame retardant E |  |  | 217.6 |  |
| Phosphorus flame retardant F |  |  |  | 217.6 |
| Tackifying resin | 107.7 | 107.7 | 107.7 | 107.7 |
| Flame retardant aid a | 6.15 | 6.15 | 6.15 | 6.15 |
| Flame retardant aid b | 4.1 | 4.1 | 4.1 | 4.1 |
| Hardness (JIS A) | 31 | 31 | 31 | 31 |
| Flame retardancy 1.5 mm | Fail | Fail | Fail | Fail |
| Flame retardancy 1.0 mm | Fail | Fail | Fail | Fail |
| Loss factor | 1.2 | 1.2 | 1.2 | 1.2 |
|  | Excellent | Excellent | Excellent | Excellent |
| Hydrolysis | Fail | Fail | Fail | Fail |
| Tackiness (formability) | Excellent | Excellent | Excellent | Excellent |

The unit of the mixing amount of each substance is parts by mass.

As can be seen from Tables 1 to 5, Examples 1 to 14 containing, with respect to 100 parts by mass of styrene elastomer (A), from 68 to 72 parts by mass of high-viscosity oil (B), from 72 to 132 parts by mass of melamine polyphosphate flame retardant (C), from 121 to 173 parts by mass of organic phosphinic acid metal salt flame retardant (D), and from 90 to 186 parts by weight of tackifying resin (E) in such range thereof had UL94 flame retardancy of V-1 or higher, a loss factor of 0.9 or higher, and good hydrolyzability and tackiness. That is, a high-damping material excellent in flame retardancy was obtained.

On the other hand, as can be seen from Table 1, Comparative Example 1 containing high-viscosity oil (B) in a small amount had high hardness and a loss factor of as low as 0.8. That is, the vibration damping properties were low. In addition, Comparative Example 2 containing a large amount of high-viscosity oil (B) had strong tackiness. Further, Comparative Example 3 containing a low-viscosity oil instead of high-viscosity oil (B) in the same amount as in Example 2 had poor flame retardancy. From this, it is understood that high-viscosity oil should be used to improve flame retardancy.

Tables 2 to 4 show the results of examining the types and amounts of flame retardants. As can be seen from Tables 2 and 3, Comparative Examples 4 and 6 containing melamine polyphosphate flame retardant (C) and organic phosphinic acid metal salt (D) in smaller amounts than the predetermined values had poor flame retardancy. On the other hand, Comparative Example 5 and Comparative Example 7 containing them in large amounts had good flame retardancy, but had a low loss factor as low as 0.8, and tended to have low vibration damping properties. This is likely because the

TABLE 5

|  | Comparative Example 16 | Example 11 | Example 12 | Example 13 | Example 14 | Comparative Example 17 |
| --- | --- | --- | --- | --- | --- | --- |
| Base polymer | 100 | 100 | 100 | 100 | 100 | 100 |
| Softener (low viscosity) |  |  |  |  |  |  |
| Softener (high viscosity) | 69.2 | 69.2 | 69.2 | 69.2 | 69.2 | 69.2 |
| Phosphorus flame retardant A | 87.8 | 87.8 | 87.8 | 87.8 | 87.8 | 87.8 |
| Phosphorus flame retardant B | 130.3 | 130.3 | 130.3 | 130.3 | 130.3 | 130.3 |
| Phosphorus flame retardant C |  |  |  |  |  |  |
| Phosphorus flame retardant D |  |  |  |  |  |  |
| Phosphorus flame retardant E |  |  |  |  |  |  |
| Phosphorus flame retardant F |  |  |  |  |  |  |
| Tackifying resin | 88.9 | 92.3 | 101.4 | 157.8 | 182.7 | 189.4 |
| Flame retardant aid a | 6.15 | 6.15 | 6.15 | 6.15 | 6.15 | 6.15 |
| Flame retardant aid b | 4.1 | 4.1 | 4.1 | 4.1 | 4.1 | 4.1 |
| Hardness (JIS A) | 32 | 32 | 31 | 30 | 28 | 28 |
| Flame retardancy 1.5 mm | Excellent | Excellent | Excellent | Excellent | Excellent | Excellent |
| Flame retardancy 1.0 mm | Excellent | Excellent | Excellent | Excellent | Good | Fail |
| Foss factor | 0.8 | 0.9 | 1.1 | 1.8 | 1.9 | 1.9 |
|  | Fail | Good | Excellent | Excellent | Excellent | Excellent |
| Hydrolysis | Excellent | Excellent | Excellent | Excellent | Excellent | Excellent |
| Tackiness (formability) | Excellent | Excellent | Excellent | Excellent | Excellent | Fail | mixing ratio of the flame retardant material to the high-damping material becomes too large and the mixing ratio of tackifying resin (E) decreases.

Further, as can be seen from Table 4, Comparative Examples 8 to 11 containing only one of melamine polyphosphate flame retardant (C) or organic phosphinic acid metal salt (D) as a flame retardant had poor UL94 flame retardancy which was evaluated as "not", despite containing a sufficient amount of flame retardant similar to the Examples. In addition, Comparative Examples 12 to 15 containing other components as a flame retardant in addition to melamine polyphosphate flame retardant (C) and organic phosphinic acid metal salt (D) also had poor flame retardancy. Hydrolysis was also observed in these products. From these results, it was found that the high-damping material containing both melamine polyphosphate flame retardant (C) and organic phosphinic acid metal salt (D) at a predetermined ratio exhibited excellent flame retardancy.

Further, as can be seen from Table 5, Comparative Example 16 containing a small amount of tackifying resin (E) had a loss factor as low as 0.8, and tended to have low vibration damping properties. Further, Comparative Example 17 containing a large amount of tackifying resin (E) had poor flame retardancy and tackiness when the sample thickness was 1.0 mm.

The present technology is not limited to the embodiments described above, and various changes and modifications can be made without departing from the spirit and scope of the present technology. Accordingly, the following claims are appended to disclose the scope of the present technology.

The invention claimed is:

1. A flame-retardant high-damping material, comprising:
100 parts by mass of styrene elastomer;
from 68 to 72 parts by mass of high-viscosity oil having a kinematic viscosity of 380 $mm^2/s$ or more at a temperature of 40° C.;
from 72 to 132 parts by mass of melamine polyphosphate flame retardant;
from 121 to 173 parts by mass of organic phosphinic acid metal salt flame retardant; and
from 90 to 186 parts by mass of tackifying resin.

2. The flame-retardant high-damping material according to claim 1, further comprising magnesium hydroxide and carbon as flame retardant aids.

\* \* \* \* \*